(12) United States Patent
Logan (10) Patent No.: US 7,025,594 B2
(45) Date of Patent: *Apr. 11, 2006

(54) METHOD AND SYSTEM FOR REPRODUCING A PROGRESSIVE OR REGRESSIVE PATTERN OF SONIC VARIATIONS

(76) Inventor: Brent E. Logan, P.O. Box 33948, Seattle, WA (US) 98133

( * ) Notice: Subject to any disclaimer, the term of this patent is extended or adjusted under 35 U.S.C. 154(b) by 319 days.

This patent is subject to a terminal disclaimer.

(21) Appl. No.: 10/071,037

(22) Filed: Feb. 8, 2002

(65) Prior Publication Data
US 2002/0076680 A1    Jun. 20, 2002

Related U.S. Application Data

(62) Division of application No. 09/421,659, filed on Oct. 20, 1999, now Pat. No. 6,494,719.

(51) Int. Cl.
*G09B 23/28* (2006.01)
(52) U.S. Cl. .................. 434/262; 434/236; 600/26; 600/27; 600/28
(58) Field of Classification Search .......... 434/262, 434/236, 319, 273; 224/664; 600/26–28, 600/545; 381/151
See application file for complete search history.

(56) References Cited

U.S. PATENT DOCUMENTS

| | | | |
|---|---|---|---|
| 3,753,433 A * | 8/1973 | Bakerich et al. ......... 600/545 X |
| 3,799,146 A * | 3/1974 | John et al. ............... 128/2.1 B |
| 3,908,634 A | 9/1975 | Monaghan |
| 3,970,785 A * | 7/1976 | Meyer ......................... 73/585 |
| 3,994,282 A | 11/1976 | Moulet |
| 4,026,278 A | 5/1977 | Ricketts et al. |
| 4,038,496 A * | 7/1977 | Feezor ......................... 73/585 |
| 4,201,225 A * | 5/1980 | Bethea, III et al. ..... 128/746 X |
| 4,284,847 A * | 8/1981 | Besserman ................ 73/585 X |
| 4,382,793 A | 5/1983 | Anderson |
| 4,785,797 A * | 11/1988 | Cuervo ..................... 601/60 X |
| 4,798,539 A | 1/1989 | Henry et al. |
| 4,819,616 A | 4/1989 | Samson |

(Continued)

OTHER PUBLICATIONS

Brent Logan, Ph.D., "Infant Outcomes of a Prenatal Stimulation Pilot Study," Pre- and Peri-Natal Psychology Journal, 6(1), Fall 1991, pp. 7-31.

(Continued)

*Primary Examiner*—Chanda L. Harris
(74) *Attorney, Agent, or Firm*—Mathews, Shepherd, McKay & Bruneau, P.A.

(57) ABSTRACT

The present invention relates to a system and method for increasing the cognitive function in a fetus. The system transmits a pattern of sonic variations to the fetus. The pattern of sonic variations is formed of a plurality of sequences of tones in which each sequence is repeated at a predetermined tempo. Each sequence of tones is selected to be transmitted to the fetus at a predetermined time during the term of the pregnancy. Preferably, each subsequent sequence of tones is selected to be repeated at increasing tempo during the term of the pregnancy, thereby providing a progressive pattern of sonic variations. A similar system and method can be used for improving the cognitive function of a premature baby. In addition, the present invention relates to a system and method for altering the cognitive function in a postnatal human by transmitting aurally or through bone conduction a progressive pattern of sonic variations or a regressive pattern of sonic variations to the wearer of the system.

14 Claims, 9 Drawing Sheets

U.S. PATENT DOCUMENTS

| | | |
|---|---|---|
| 4,830,007 A | 5/1989 | Stein |
| 4,862,505 A * | 8/1989 | Keith et al. ............... 381/60 X |
| 4,898,179 A | 2/1990 | Sirota |
| 4,934,998 A | 6/1990 | Thomas, Jr. |
| 4,941,453 A * | 7/1990 | Shakas et al. ............ 600/28 X |
| 5,033,968 A | 7/1991 | Hecht |
| 5,036,858 A * | 8/1991 | Carter et al. ............ 600/545 X |
| 5,135,468 A * | 8/1992 | Meissner ..................... 600/28 |
| 5,443,076 A * | 8/1995 | Bau ........................... 600/544 |
| 5,491,756 A | 2/1996 | Francais |
| 5,495,853 A * | 3/1996 | Yasushi ..................... 600/545 |
| 5,725,472 A * | 3/1998 | Weathers .................. 600/21 X |
| 5,827,173 A | 10/1998 | Lindsay |
| 5,873,736 A | 2/1999 | Harrison |
| 5,898,787 A | 4/1999 | Stanford |
| 5,928,160 A * | 7/1999 | Clark et al. ............. 600/559 X |
| 5,957,699 A * | 9/1999 | Peterson et al. ........ 434/350 X |
| RE36,348 E * | 10/1999 | Carter et al. ............ 600/545 X |
| 6,004,259 A * | 12/1999 | Sedaros ........................ 600/28 |
| 6,299,632 B1 * | 10/2001 | Jaillet ...................... 607/88 X |
| 6,443,977 B1 * | 9/2002 | Jaillet ...................... 607/88 X |
| 6,494,719 B1 * | 12/2002 | Logan .................... 434/262 X |

OTHER PUBLICATIONS

Brent Logan, Ph.D., "Teaching the Unborn: Precept and Practice," Pre- and Peri-Natal Psychology Journal, 2(1), Fall 1987, pp. 9-24.

Brent Logan, Ph.D., "Fetal Sonic Stimulation," The Royal College of General Practitioners Official Reference Book, London, 1995.

* cited by examiner

| | | | NOTES | | | | | | | | HERTZ |
|---|---|---|---|---|---|---|---|---|---|---|---|
| 50a | A | A | A | C | A | A | A | C | A | A | A | 1.00 |
| 50b | A | A | C | A | A | C | A | A | C | A | A | 1.25 |
| 50c | A | C | A | C | A | C | A | C | A | C | A | 1.50 |
| 50d | A | A | C | C | A | A | C | C | A | A | C | 1.75 |
| 50e | A | C | C | A | C | C | A | C | C | A | C | 2.00 |
| 50f | A | C | C | C | A | C | C | C | A | C | C | 2.25 |
| 50g | A | A | C | C | C | A | A | C | C | C | A | 2.50 |
| 50h | A | A | A | C | C | C | A | A | A | C | C | 2.75 |
| 50i | A | A | A | C | C | C | E | A | A | A | C | 3.00 |
| 50j | A | A | A | C | C | C | E | E | A | A | A | 3.50 |
| 50k | A | A | A | C | C | C | E | E | E | A | A | 4.00 |
| 50l | A | A | A | C | C | C | E | E | E | C | C | 4.50 |
| 50m | A | A | C | C | E | E | C | C | A | A | C | 5.00 |
| 50n | A | A | C | C | E | E | A | A | C | C | E | 5.50 |
| 50o | A | C | E | A | C | E | A | C | E | A | C | 6.00 |
| 50p | A | C | E | C | A | C | E | C | A | C | E | 6.50 |

METHOD AND SYSTEM FOR REPRODUCING A PROGRESSIVE OR REGRESSIVE PATTERN OF SONIC VARIATIONS

This application is a divisional of U.S. patent application Ser. No. 09/421,659 filed Oct. 20, 1999 now U.S. Pat. No. 06,494,719.

BACKGROUND OF THE INVENTION

1. Technical Field

The present invention relates to a method and system of reproducing a pattern of sound variations and applying the pattern to a human fetus, infant, child, adolescent or adult, with possible animal applications.

2. Description of the Related Art

Systems are known for transmitting external stimuli to the human fetus. U.S. Pat. No. 4,798,539 describes a method and system for systematically educating and communicating with a baby in its mother's womb. Educational messages or soothing messages are transmitted to the fetus. The messages can include, for example, soothing music, simple words or nursery rhymes.

U.S. Pat. No. 5,033,968 describes a method and apparatus for presenting voice or noise to a fetus in which the sounds more accurately resemble the same sounds as the baby will hear after birth. Recorded sounds are contoured and amplified. The sound range is in the 1000 to 2000 hertz range on the order of 90 to 95 decibels.

U.S. Pat. No. 5,491,756 discloses a system for delivering sound to a fetus through the mother's abdomen and which also allows monitoring of the effects of the sound on the fetal child. A sound generator, for example a radio or so called "walkman" unit, generates sound. The sound is applied by speakers located on a belt. The belt is juxtapositioned to the abdomen in proximity of the fetal child. The sound can include soothing music or like sounds. A stethoscope is located in proximity to the fetal child to monitor the effects on the fetal child.

Mental performance in vertebrates is signified by electrical energy which can be monitored on the cranial surface with skin transducers producing an electro-encephalogram (EEG). Such output is measured in cycles per second (hertz). An alpha rhythm relates to a human baseline indicating a state of relaxed wakefulness when the eyes are closed. Some analyses have shown alpha rates generally rise according to increased neural complexity on the evolutionary scale, from amphibia to *Homo sapiens*. Human alpha rhythm is attained by puberty in the range of 8–13 hertz, averaging 10 hertz, and diminishes only slightly with age.

Both prebirth and newborn alpha rhythms, referred to as protoalpha, have been found to be in the range of 1–2 hertz and the alpha rhythms increase incrementally until reaching the adult maximum of 10 hertz. Developmentally, it has been suggested that an alpha rhythm can be both a significant empirical indicator and predictor of reduced or amplified mental capacity. A child whose alpha rhythm is advanced beyond the norm may therefore have attained a more mature level of cognitive function than someone of similar age having a lower alpha rhythm.

It is desirable to provide a method and system for reproducing sonic variations in which the tempo and/or pitch of the variations can be altered to provide a predetermined pattern which can be applied to a wearer of the system in order to affect a desired increased cognitive function.

SUMMARY OF THE INVENTION

The present invention relates to a system and method for increasing the cognitive function in a fetus. It has been found that a progressive pattern of sonic variations reproducing incrementally faster alpha rhythms at levels and formats appropriate to the prenatal stage which is repeatedly transmitted to the fetal child is advantageous in increasing cognitive function. The pattern of sonic variations is formed of a plurality of sequences of tones in which each sequence is repeated at a predetermined frequency. Each sequence of tones is selected to be transmitted to the fetus at a predetermined time during the term of the pregnancy. Preferably, each subsequent sequence of tones is selected to be repeated at increasing frequency during the term of the pregnancy, thereby providing a progressive pattern of sonic variations.

The method can include a determination of a maternal bloodpulse baseline as it occurs in utero. Tones in the pattern of sonic variations can be determined as the tone of the maternal bloodpulse baseline or tonal variations therefrom. The tonal variations can be selected to increase in subsequent sequences of tones.

A similar system and method can be used for improving the cognitive function of a premature baby. In addition, the present invention relates to a system and method for altering the cognitive function in a postnatal human being by transmitting aurally or through bone conduction a progressive pattern of sonic variations or a regressive pattern of sonic variations to the wearer of the system.

The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
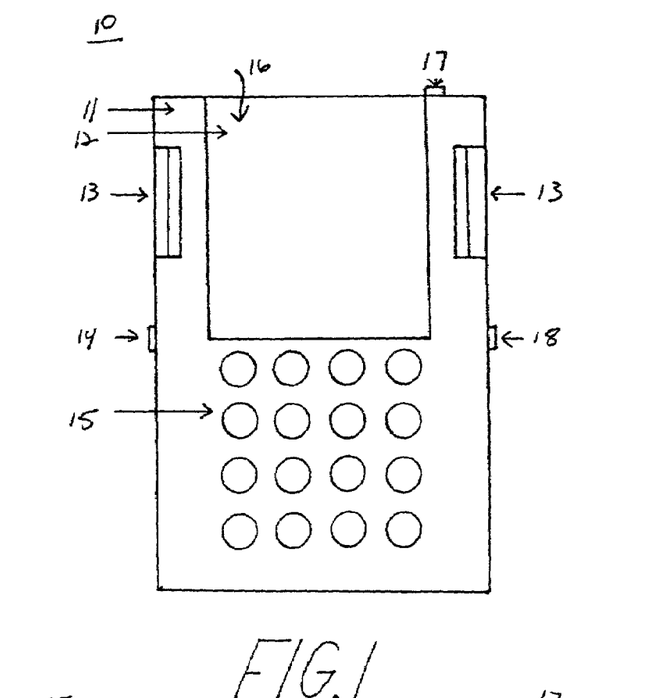
FIG. 1 is a schematic diagram of a front view of a system for reproducing sonic variations.
Figure 2:
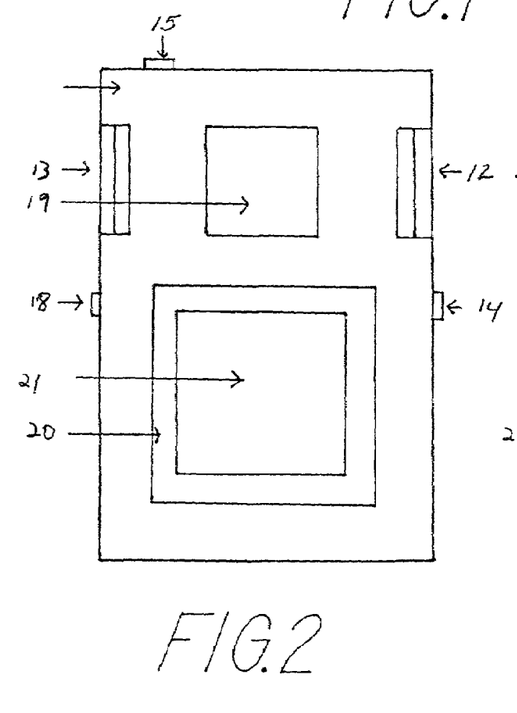
FIG. 2 is a schematic diagram of a rear view of the system.
Figure 3:
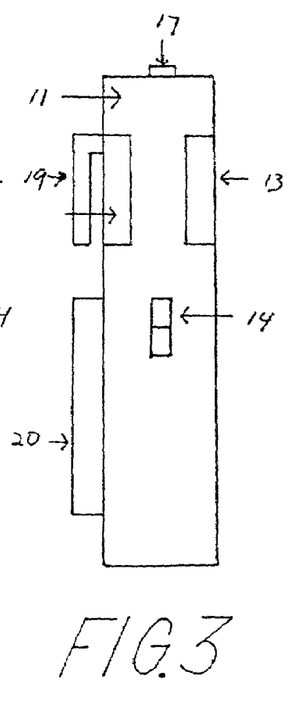
FIG. 3 is a schematic diagram of a side view of the system.

FIGS. 1–3 illustrate a system for reproducing sonic variations 10 in accordance with the teachings of the present invention. Housing 11 includes power supply cover 12 for covering a power supply such as batteries (not shown). Housing 11 has a substantially rectangular or square shape. Openings 13 are formed in housing 11 for receiving a belt or band formed for example of elastic or fabric. On/Off switch 14 controls operation of power to system 10.

Program buttons 15 control selection of a plurality of patterns of sonic variations 16, as described in more detail below. For example, each of the sixteen program buttons 15 can be associated to access one of sixteen sequences of tones stored in system 10 which sequences form the pattern of sonic variations 16. For example, the pattern of sonic variations 16 can be stored on a microchip. Alternatively, a cassette or compact disc player can be used with system 10 to access patterns of sonic variations stored respectively on a cassette tape or compact disc or other removable storage media. Low power indicator light 17 indicates low power of the power supply. Jack opening 18 extends into housing 11 for receiving supplemental speakers or earphones (not shown). Earphones can be used to listen to the patterns of sonic vibrations being transmitted by system 10.

Apparel clip 19 extends from housing 11. Apparel clip 19 can be clipped to a waistband of a wearer of system 10. Sound proofing material 20 surrounds speaker face 21 for directionally focusing sound from system 10.

Figure 4:
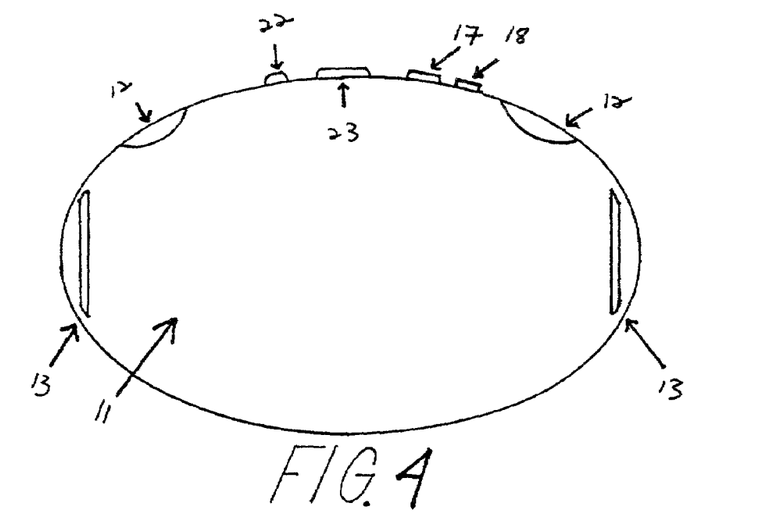
FIG. 4 is a schematic diagram of a front view of an alternate embodiment of the system.
Figure 5:
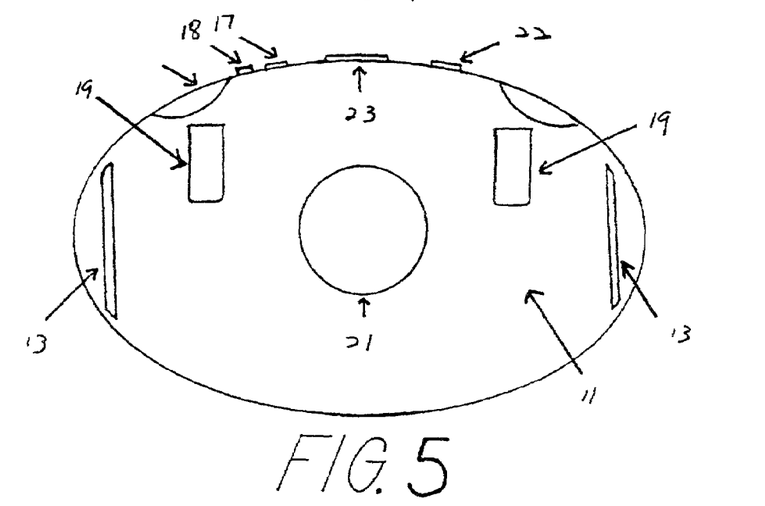
FIG. 5 is a schematic diagram of a rear view of the system shown in FIG. 4.
Figure 6:
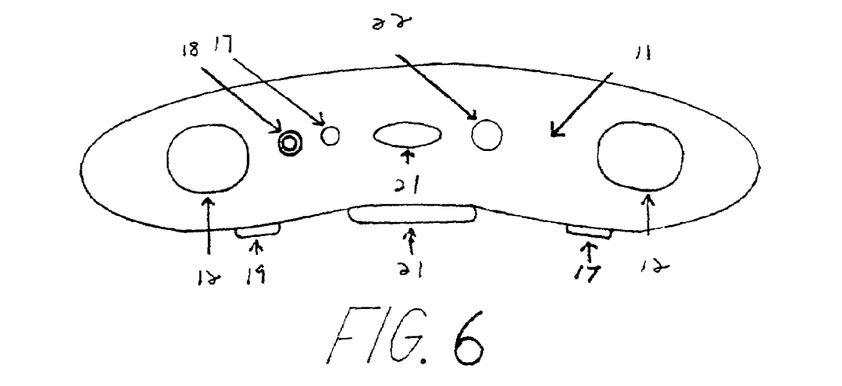
FIG. 6 is a schematic diagram of a front view of an alternate embodiment of the system.

FIGS. 4 and 5 illustrate an alternative embodiment in which housing 11 has a elliptical or circular shape. Button 22 is used to access the pattern of sonic vibrations 16 stored in system 10. For example, button 22 can sequentially access each sequence of tones forming the pattern of sonic variations 16 in order to aid a wearer in sequentially selecting the sequence of tones to be transmitted to the fetal child. Liquid crystal display 23 is attached to housing 11. Liquid crystal display 23 provides viewing of the accessed sonic pattern of variations 16. FIG. 6 illustrates a top view of housing 11, which has a contoured shape for applying speaker face 21 to a curved shape such as an abdomen of a pregnant woman.

Figure 7:
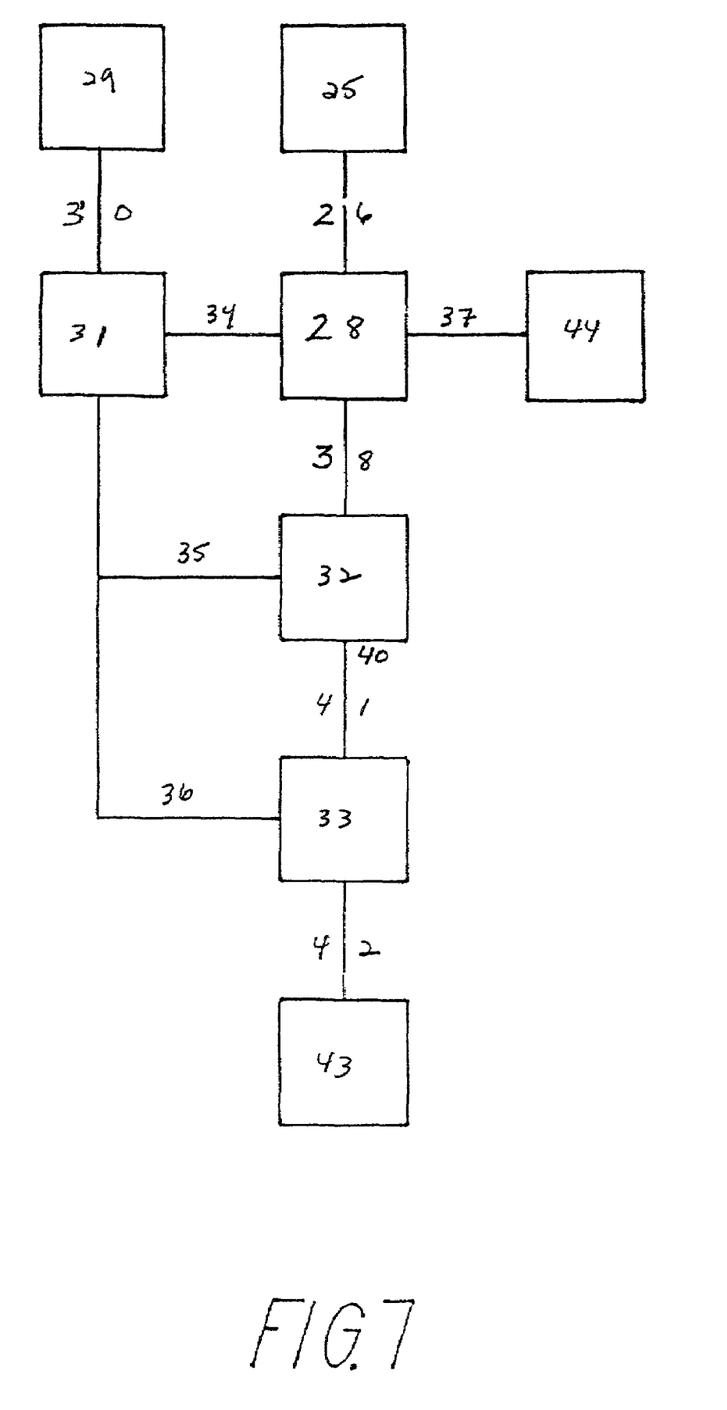
FIG. 7 is a schematic diagram of electronic circuitry for the system.

FIG. 7 illustrates a schematic circuit diagram of electronic circuitry for system 10. Selection switch 25 provides on/off contact and program selection through connection 26 to power and countercircuit input tabs of microchip 28. For example, microchip 28 can be an eighteen-pin digitally stored microchip. Power initiates as low voltage alternating current 29 and is converted through converter 30 to direct current for charging battery 31. Battery 31 provides power to microchip 28, voice synthesizer 32 and transducer driver 33 through connection 34, connection 35 and connection 36, respectively. The direct current is controlled by selection switch 25 through connection 34 and connection 37. When selection switch 25 is pressed, the signal passes through connection 37 to microchip 28. Microchip 28 generates pulse signals through connection 38 to voice synthesizer 32. Voice synthesizer 32 generates sonic signal 40 through connection 41 to transducer driver 33. Transducer 43 is driven by transducer driver 33 through connection 42. Timer circuit 44 produces a pulse through connection 45 when the timer counter overflows.

A pattern of sonic variations 16 is formed of a plurality of sequences of tones. For example, the pattern of sonic variations 16 can be formed of sixteen sequences of tones. Each sequence of tones is repeated at a predetermined tempo. Each sequence of tones can be a repetition of the same tone or a repetition of a pattern of tonal variations having different pitches. Each of the repeated sequences of tones is transmitted by system 10 for a predetermined period of time to a wearer of system 10. The period of time each repeated sequence is transmitted can be determined for various applications of system 10. For example, the period of time can be the term of pregnancy for a prenatal application or a period of weeks or months for a postnatal application.

A progressive pattern of sonic variations is defined as a pattern in which the tempo is increased at which each sequence in the pattern is repeated. A regressive pattern of sonic variations is a pattern in which the tempo is decreased at which each sequence in the pattern is repeated.

Figure 8A:
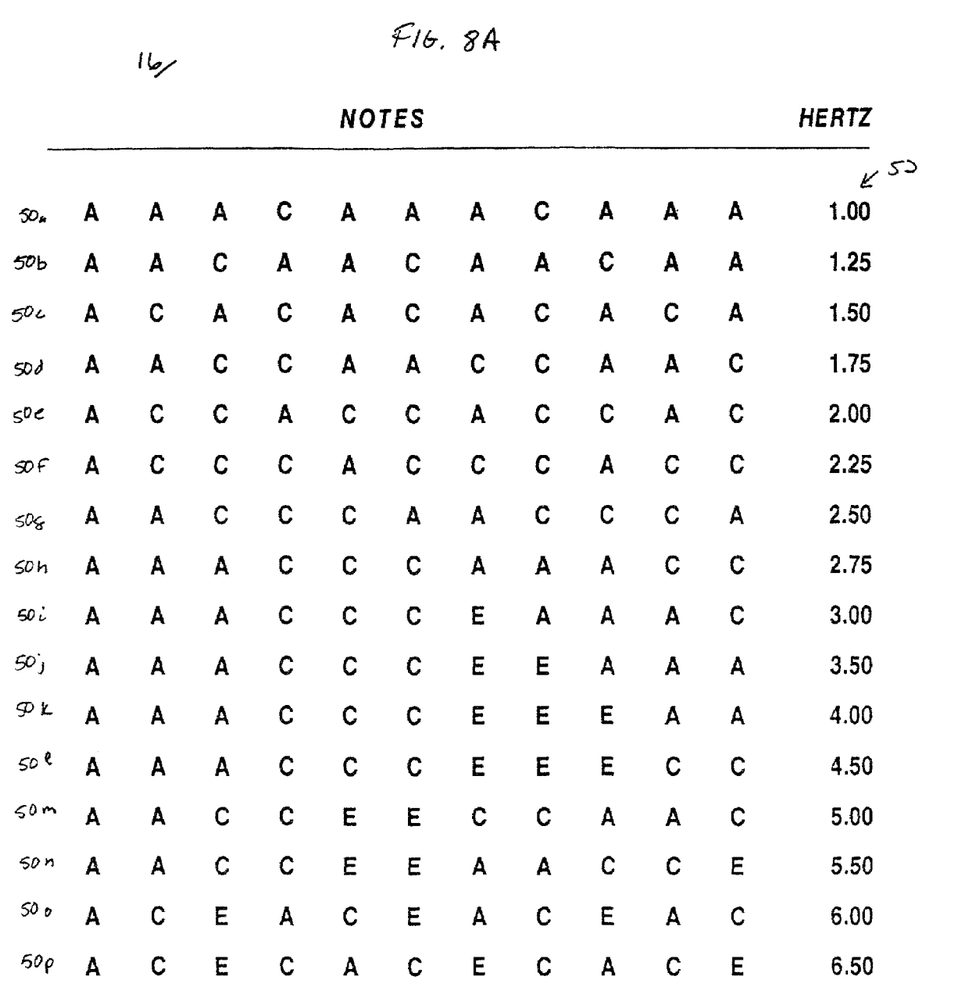
FIG. 8A is a schematic diagram of a progressive sound pattern of sonic variations for use with the system.

Operation of system 10 in a method for improving cognitive function of a fetus in utero is shown by the following example. The system is used for the auditory driving of alpha rhythm, and imprinting of the fetal child. FIG. 8A illustrates an example of a progressive pattern of sonic variations 16 for increasing the cognitive function of a human fetus in utero. In this example, a progressive pattern of sonic variations is formed of 16 sequences of tones represented in rows 50a–50p. The tone represented by "A" is a tone of an in utero baseline maternal bloodpulse, which will be described in more detail below. The tone represented by "C" is a tone which is two whole notes higher than the tone represented by "A". The tone represented by "E" is a tone which is two whole notes higher than the tone represented by "C". The sequence of tones are repeated and the repeated sequence of tones are transmitted for a particular duration, for example one hour. The tempo at which each of the sequences of tones in rows 50a–50p is transmitted to the fetus in utero is represented in column 52. Alternatively, increasing tonal variations can be used in each subsequent sequence with each sequence having the same tempo.

In this example, the frequency at which each sequence is transmitted is increased in first 0.25 hertz and then 0.50 hertz increments from the resting human heart rate of 1 hertz. In the progressive pattern of sonic variations in this example, each successive sequence of tones has a pattern of increased tonal variations from the maternal baseline tone so that the last pattern has the fewest tones of the maternal baseline represented by "A" and the most tonal variations represented by "C" and "E". In the method, each of the sequences of tones represented in rows 50a–50p is transmitted to the fetus during different periods within the term of pregnancy. For example, each sequence of tones can be played during a particular week of pregnancy. Accordingly, the first sequence represented by row 50a can be played for a length of time, i.e. one hour, a few times a day to the fetus in utero starting midterm of the pregnancy, i.e. the $24^{th}$ week of pregnancy. It has been found that stimulation after the first trimester of pregnancy is advantageous since there is better developed fetal hearing. A second sequence represented by row 50b can be played the subsequent week of pregnancy, i.e. $25^{th}$ week of pregnancy, and each subsequent sequence represented by rows 50c–50p is played during subsequent weeks of pregnancy until birth of the fetus at approximately 39.5 weeks. It has been found that application of the above-described method results in a higher alpha rhythm for the infant stimulated with system 10 than the alpha rhythm measured in infants not stimulated with system 10. It will be appreciated that the period of time for transmitting each sequence can be varied according to the time at which the method begins, i.e., if the method is initiated at the $30^{th}$ week each of the sequences of tones represented by rows 50a–50p could be transmitted to the fetal child for approximately four days. Also, other progressive patterns of sonic variations having different increasing frequencies or tonal variations could be used to increase cognitive function in accordance with the teachings of the present invention.

Figure 8B:
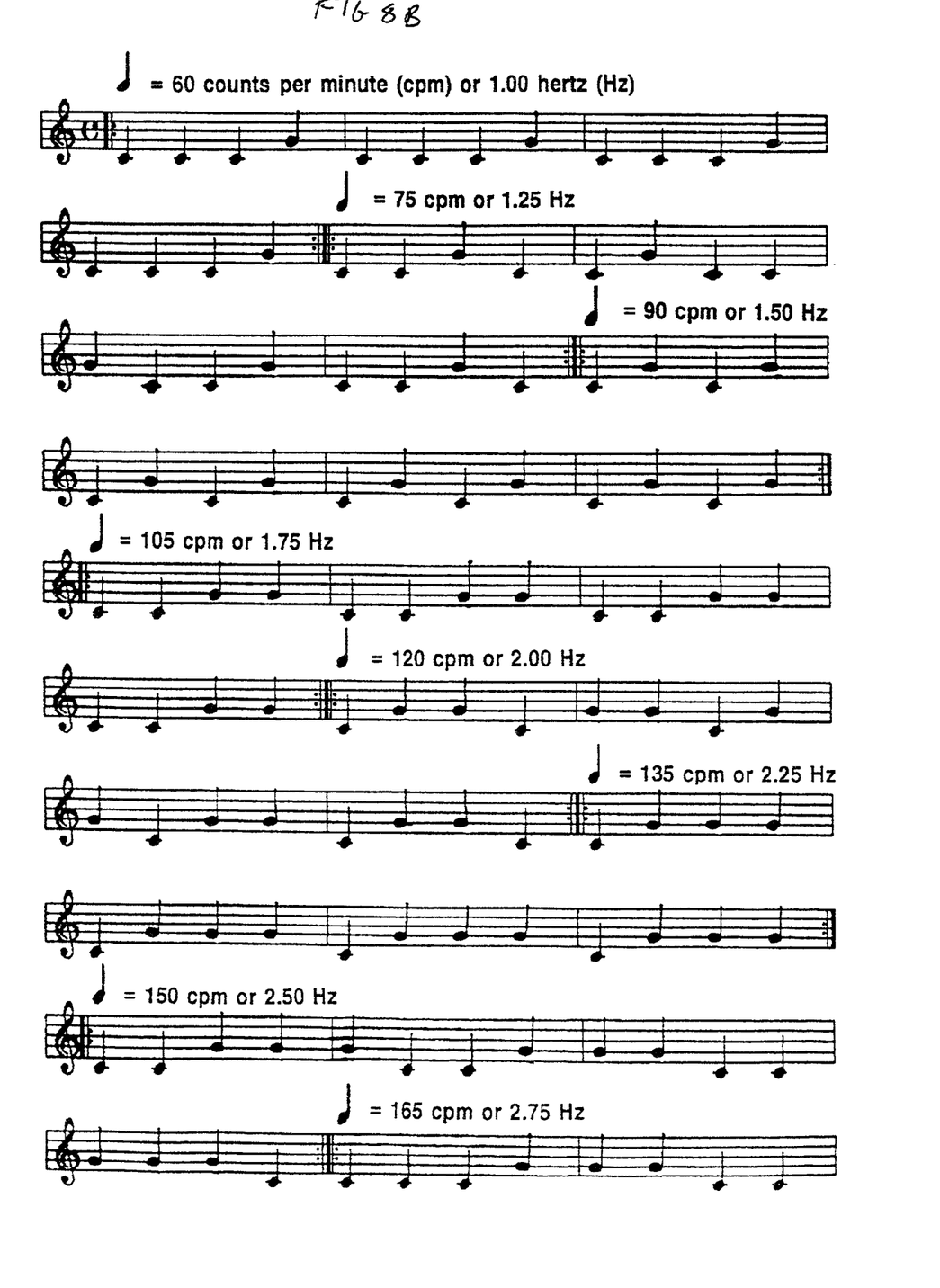
FIG. 8B is musical notation of the progressive sonic pattern of sonic variations shown in FIG. 8A.

FIG. 8B presents in standard musical notation the progressive pattern of sonic patterns shown in FIG. 8A of tones increasing in tempo from an alpha rhythm baseline and adding pitch variations of two and four whole notes from the baseline tone.

In alternate postnatal embodiments for offsetting under or overactive physical or psychological status, a progressive pattern of sonic variations in alpha rhythm or a regressive pattern of sonic variations in alpha rhythm can be transmitted to the individual over a treatment time period for accelerating or decelerating cortical alpha rhythms in the treated individual. The pattern of sonic variations permit users to achieve stimulatory or relaxant behavioral states by receiving transmissions as progressively or regressively sequenced audiovibratory frequencies, thereby adjusting alpha brainwave activity. In the concurrent absence of visual stimuli, the pattern of sonic variations increase or decrease the rates of cortical data processing by providing throughout the mental structure governing influences which promote like sinusoidal patterns. From auditory driving, these physiosonic impulses gradually move the existing cognitive mode toward its desired alternative over a selected period of time. Duration of the effect is dependent upon length of application, user psychodynamics, and subsequent environmental factors. The advantages of operation of system 10 for applying a selected progressive pattern of sonic variations to infants, children, adolescents, and adults are improving cognitive performance, overcoming tiredness, and mitigating depression. The advantages of operation of system 10 for applying a selected regressive pattern of sonic variations to infants, children, adolescents, and adults are reducing stress and hypertension, countering sleep disorders and calming hyperactivity. System 10 could also be altered for sonic and/or physical requirements of designated species for application to animals.

Figure 9:
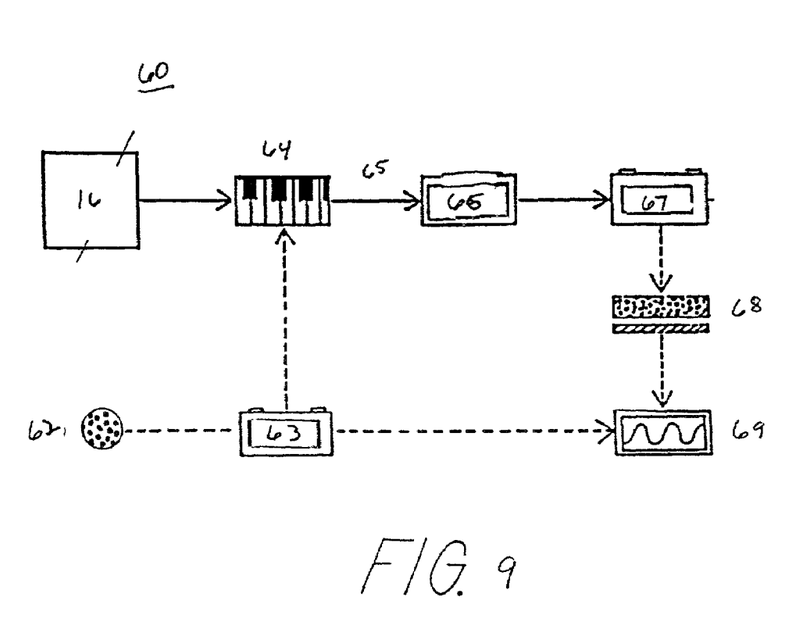
FIG. 9 is a schematic diagram of a method for obtaining an in utero sonic baseline and generating the pattern of sonic variations.

FIG. 9 illustrates a method for obtaining an in utero sonic baseline 60 and generating the baseline outside the defined pattern of sonic variations 16. Microphone 62 is inserted through the cervix to obtain a real-time in utero bloodpulse recording 63 of the womb's sounds. Microphone 62 can be a hydrophone or liquid-impervious microphone. Digital sampling system 64 permits progressive temporal sequences 65 to be derived from in utero bloodpulse recording 63. Adjustments in tone, pitch, and volume of digitally sampled progressions is performed in block 66 in order to compensate for abdominal tissue, fluid and bone attenuation and provide the progressive pattern of sonic variations 16. Preferably, the sound volume of the transmitted pattern of sonic variations 16 can be adjusted below that normally experienced in the womb yet sufficient for fetal discernment. The progressive pattern of sonic variations 16 is transmitted to a recipient fetus in utero with uterine transmission source 67. The progressive pattern of sonic variations 16 applied by uterine transmission source 67 is also filtered back through womb wall 68, real or simulated. Real-time analyzer 69 compares the received filtered baseline from womb wall 68 with that of uterine transmission source 67 for assuring fidelity of the progressive pattern of sonic variations to the in utero bloodpulse.

Figure 10:
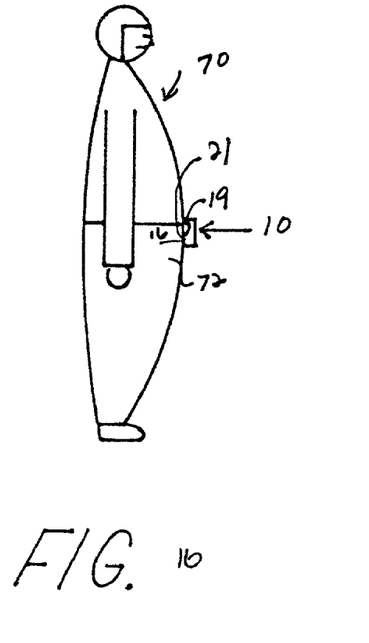
FIG. 10 is a schematic diagram of the system in a prenatal application.

FIG. 10 shows prenatal use of system 10 positioned in proximity to an abdomen of woman 70 by means of apparel clip 19 attached to apparel 72 worn by woman 70. Speaker face 21 faces the fetus in utero for transmission of the pattern of sonic variations 16 to the cerebral cortex of the fetus.

Figure 11:
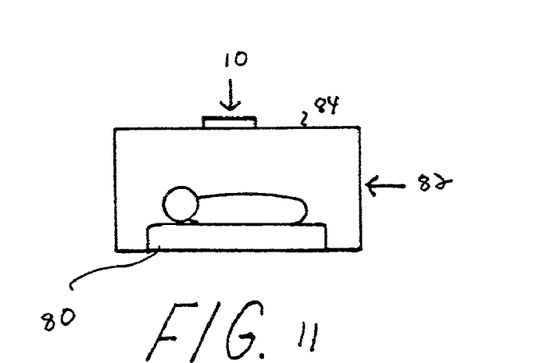
FIG. 11 is a schematic diagram of the system in a premature baby application.

FIG. 11 shows use of a system with a premature baby 80 by affixing system 10 to hospital incubator 82, thereby locating system 10 proximately to premature baby 80. The pattern of sonic variations 16 is transmitted through or from wall 84 to the cerebral cortex of premature baby 80.

Figure 12:
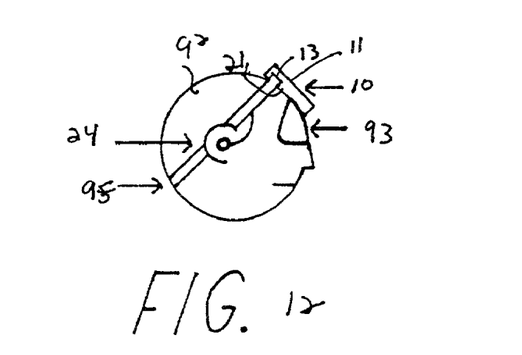
FIG. 12 is a schematic diagram of the system in a postnatal application.

FIG. 12 shows a postnatal application of system 10 in which speaker face 21 is positioned on cranial surface of human 92 for applying the pattern of sonic variations 16 to the cerebral cortex. Eye mask 93 can be placed over the wearers eyes to block visual stimuli. Earphone 94 also provides aural transmission of the pattern of sonic variations 16 to human 92. Elastic or fabric belt or band 92 extends through openings 13 of housing 11 for positioning system approximate to the cerebral cortex.

Figure 13:
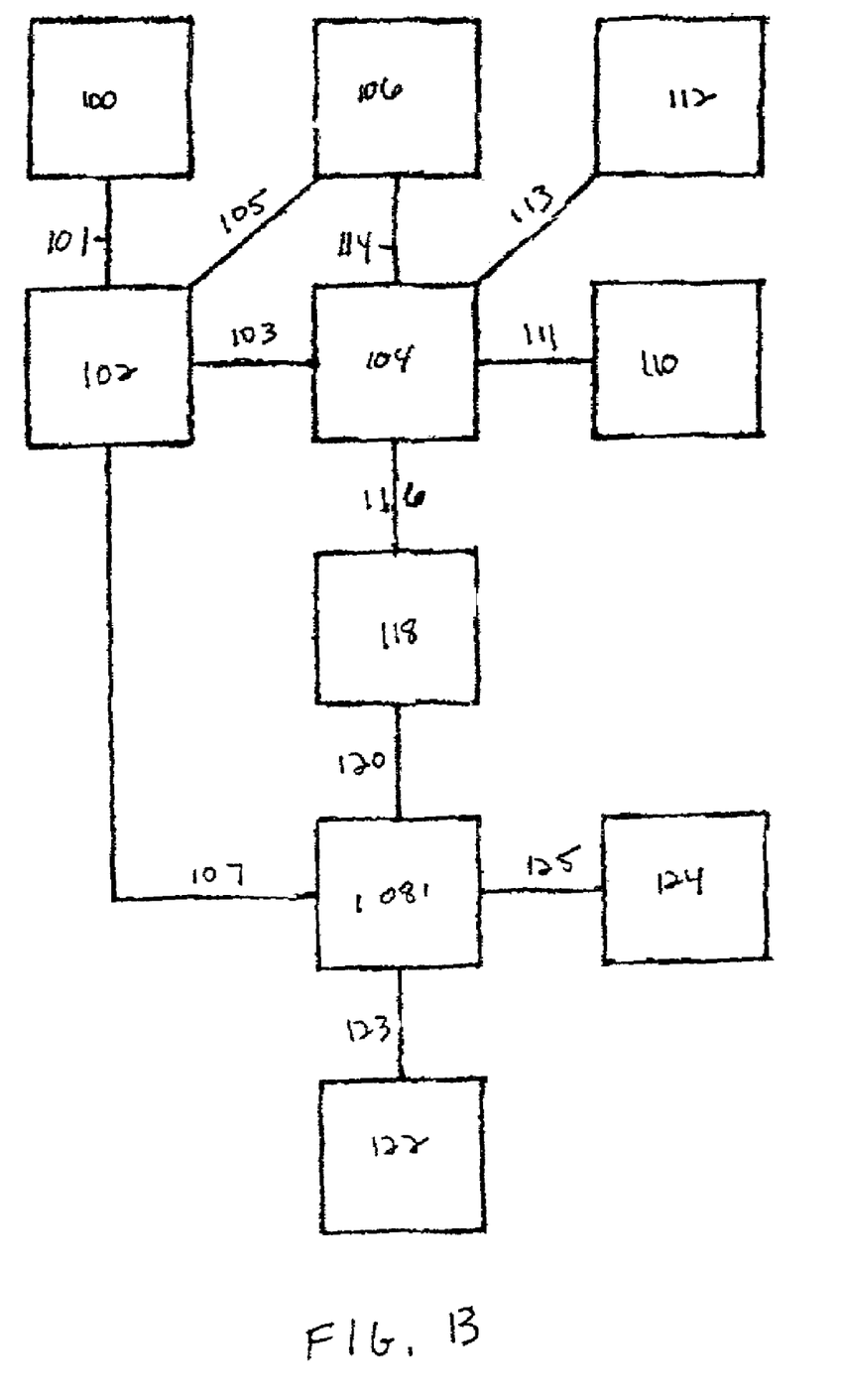
FIG. 13 is a schematic diagram of alternative electronic circuitry for the system.

FIG. 13 illustrates an alternative circuit diagram of electronic circuitry for system 10. Battery 100 provides voltage to regulator 102 through connection 101. Regulator 102 provides power to microprocessor 104, memory device 106 and transducer driver 108 through connection 103, connection 105 and connection 107 respectively. Selection switch 110 provides program selection and power-up interrupt on input tab of microprocessor 104 through connection 111. For example, microprocessor 104 can be a forty-four-pin digitally stored microprocessor such as manufactured by Microchip as PIC16C64.

When interrupted by selection switch 110, microprocessor 104 displays the current file number on display 112 through connection 113. Further interrupts by selection switch 110 to microprocessor 104 select the next file number in sequence. When a file is selected, microprocessor 104 queries memory device 106 through connection 114 for the sound waveform information. Microprocessor 104 generates width modulated pulse signals through connection 116 to filter network 118. Filter network 118 converts the width modulated pulse signals into a voltage waveform. The voltage waveform is passed from the filter network 118 to the transducer driver 108 through connection 120. Transducer 122 and transducer 124 are driven by transducer driver 108 through connection 123 and connection 125 respectively.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

I claim:

1. A method of treating a postnatal human for accelerating or decelerating cortical alpha rhythms of the postnatal human comprising the steps of:

determining a pattern of sonic variations in alpha rhythm, said pattern comprising a plurality of sequences of tones each sequence being repeated at a predetermined tempo; and transmitting each of said sequences of tones in a soundwave form to said human during a predetermined period, wherein a tempo at which each subsequent said sequence of tones is repeated is selected to be increased or decreased during the predetermined period thereby accelerating or decelerating cortical alpha rhythms of the postnatal human and said tones in said pattern of sonic variations are an alpha rhythm baseline tone or a tonal variation from said alpha rhythm baseline tone.

2. The method of claim 1 further comprising the step of:
storing said pattern of sonic variations in an electronic integrated circuit.

3. The method of claim 2 wherein said transmitting step comprises transmitting said stored plurality of patterns from said electronic integrated circuit to said human with a sonic transducer.

4. A method of treating a premature baby for accelerating or decelerating cortical alpha rhythms of the premature baby comprising the steps of:
determining a pattern of sonic variations in alpha rhythm, said pattern comprising a plurality of sequences of tones, each sequence being repeated at a predetermined tempo; and
transmitting each of said sequences of tones in soundwave form to said premature baby during a predetermined period,
wherein a tempo at which each subsequent said sequence of tones is repeated is selected to be increased during the predetermined period thereby accelerating or decelerating cortical alpha rhythms of the premature baby and said tones in said pattern of sonic variations are an alpha rhythm baseline tone or a tonal variation from said alpha rhythm baseline tone.

5. The method of claim 4 further comprising the step of:
storing said pattern of sonic variations in an electronic integrated circuit.

6. The method of claim 5 wherein said transmitting step comprises:
transmitting said stored plurality of patterns from said electronic integrated circuit to said premature baby with a sonic transducer.

7. A system for treating a postnatal human accelerating or decelerating cortical alpha rhythms of the postnatal human comprising:
means for determining a pattern of sonic variations in alpha rhythm, said pattern comprising a plurality of sequences of tones, each sequence being repeated at a predetermined tempo;
means for selecting each of said sequences of tones to be transmitted at a predetermined time during a predetermined period; and
means for transmitting each of said sequences of tones in soundwave form to said human during said predetermined period,
wherein said tones in said pattern of sonic variations are an alpha rhythm baseline tone or a tonal variation from said alpha rhythm baseline tone in which subsequent sequences increase or decrease in tempo.

8. The system of claim 7 further comprising:
means for storing said pattern of sonic variations in an electronic integrated circuit.

9. The system of claim 8 wherein means for transmitting comprises said stored plurality of patterns from said electronic integrated circuit to said human with a sonic transducer.

10. A system for treating a postnatal human accelerating or decelerating cortical alpha rhythms of the postnatal human comprising:
means for determining a pattern of sonic variations in alpha rhythm, said pattern comprising a plurality of sequences of tones, each sequence being repeated at a predetermined tempo, said tones in said pattern of sonic variations are an alpha rhythm baseline tone or a tonal variation from said alpha rhythm baseline tone;
means for selecting each of said sequences of tones to be transmitted at a predetermined time during a predetermined period;
means for transmitting each of said sequences of tones in soundwave form to said human during said predetermined period; and
means for positioning a transmission means proximate to a forehead of said human and transmitting said sequence of tones aurally thereby accelerating or decelerating cortical alpha rhythms of the postnatal human.

11. A system for treating a premature baby accelerating or decelerating cortical alpha rhythms of the premature baby comprising:
means for determining a pattern of sonic variations in alpha rhythm, said pattern comprising a plurality of sequences of tones, each sequence being repeated at a predetermined tempo, said tones in said pattern of sonic variations are an alpha rhythm baseline tone or a tonal variation from said alpha rhythm baseline tone in which subsequent sequences increase in tempo;
means for selecting each of said sequences of tones to be transmitted at a predetermined time; and
means for transmitting each of said sequences of tones in soundwave form to said premature baby thereby accelerating or decelerating cortical alpha rhythms of the premature baby.

12. The system of claim 11 wherein said tones in said pattern of sonic variations are a baseline tone or a tonal variation from said baseline tone in which subsequent sequences increase in tempo.

13. The system of claim 11 further comprising:
means for storing said pattern of sonic variations in an electronic integrated circuit.

14. The system of claim 13 wherein said means for transmitting comprises transmitting said stored plurality of patterns from said electronic integrated circuit to said premature baby with a sonic transducer.

* * * * *